Dec. 6, 1938.   B. WALKER   2,139,341

MOTOR VEHICLE

Original Filed March 21, 1932

Inventor:
Brooks Walker
By
Harness, Dickey & Pierce
Attorneys.

Patented Dec. 6, 1938

2,139,341

UNITED STATES PATENT OFFICE 2,139,341

MOTOR VEHICLE

Brooks Walker, Piedmont, Calif.

Original application March 21, 1932, Serial No. 600,126. Divided and this application February 1, 1935, Serial No. 4,498

5 Claims. (Cl. 180—1)

This application is a divisional application of the case filed in the United States Patent Office, entitled Vehicle lifting and traversing device, filed March 21, 1932, Serial No. 600,126, now United States Patent No. 1,990,150, dated February 5, 1935.

My invention relates to vehicle lifting and traversing device, therefore, and particularly to devices employing the spare wheel for raising one end of the vehicle, and more particularly for a rigid type cover for said spare tire to provide a suitable cover for said auxiliary tire which shall be preferably of a rigid material so formed as to cover a major portion of the ground engaging surface of the spare tire as viewed from the rear of the car and still be so constructed as to allow said tire to raise and lower from its partially inclosed position to its ground engaging position while the tire cover is attached to the vehicle chassis; to provide means whereby the tire cover may be readily removed preferably without the use of tools for the interchange of wheels in case of a flat tire or other causes.

Other objects and features of novelty of my invention will be either specifically pointed out or will become apparent when referring, for a better understanding of my invention, to the following description in conjunction with the accompanying drawing, wherein.

Figure 1:
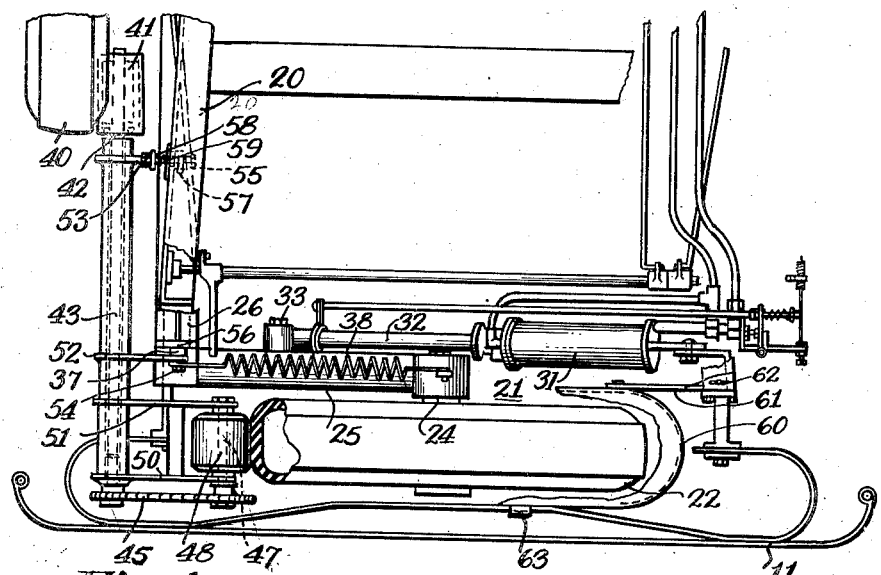
Fig. 1 is a view in top plan, with certain parts shown in section, of a vehicle assembly embodying the invention.
Figure 2:
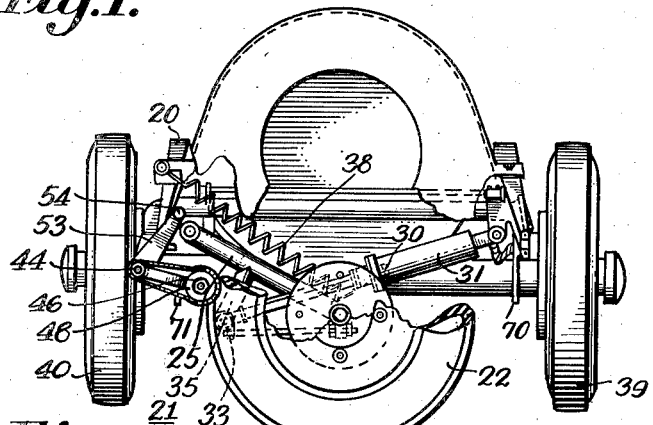
Fig. 2 is a view in rear elevation of the vehicle shown in Fig. 1, with the auxiliary wheel in its road engaging position.
Figure 3:
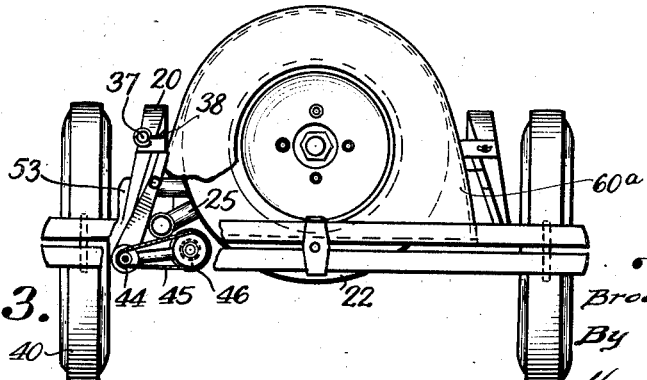
Fig. 3 is a view corresponding to Fig. 2, but showing the auxiliary wheel in its raised or ineffective position.

Referring to Figures 1, 2, and 3, I have illustrated an automotive vehicle chassis 20 having a lifting and traversing device 21 which is provided with a single wheel 22, upon which the vehicle is raised and traversed in an arc about the opposite end of the vehicle. In these views, I have illustrated the use of a spare wheel such as is employed in automotive vehicles, as the wheel upon which one end of the vehicle is supported, although it is to be understood that the use of the spare wheel in this connection is not essential to the invention, although it will probably be preferable and cheaper to use the spare wheel. The spare wheel 22 is mounted for rotation about an axle 24, extending rearwardly from the arm 25 which is pivotally attached to the vehicle chassis at the bearing 26. Within the cylinder 31 is reciprocally mounted a piston which is rigidly attached to the piston rod 32, which is in turn pivotally attached to an extension 35 of the arm 25 by the bolt 33 in such a manner that a fluid pressure against the piston will cause the piston rod to project from the cylinder and actuate the arm 25 in such a manner that the wheel 22 supported thereon will be caused to lower into ground engagement and upon continued movement thereof will cause a lifting of one end of the vehicle chassis away from the ground.

Spring 38 has been provided, one end of which is attached to the arm 25 at a point adjacent the axle 24 and the other end of which is attached to a bolt 37 which is carried on the vehicle chassis preferably in a manner as illustrated wherein the leverage of the spring is greatest when the tension is the least and, vice-versa. This spring has sufficient tension to retract the wheel 22 to the position shown in Figure 3 with a generous additional tension to prevent rattles and assure a positive and speedy return of the mechanism to its inactive position whenever the controls are placed in the return position without the necessity of engine power application to perform this function.

A mechanism is provided for driving engagement between one of the driven wheels 40 of the vehicle and the auxiliary wheel 22. This consists of a roller 41 adapted for engagement with the rear wheel 40, said roller being firmly attached to a shaft 42, which is rotatably mounted in suitable bearings in the housing 43. At the opposite end of the shaft 42 is rigidly attached a sprocket 44 which is attached to a second sprocket 46 by the chain 45. The sprocket 46 is rigidly attached to the shaft 47, which is in turn rigidly attached to the roller 48. The shaft 47 is mounted for rotation in suitable bearings in the arms 50 and 51, which arms are rigidly attached to the housing 43. Two arms 52 and 53 are likewise firmly attached to the housing 43 by some suitable means such as welding and carry at their upper end pivot bolts 54 and 55, respectively, which bolts are rigidly attached to the vehicle chassis by suitable brackets 56 and 57, respectively. An ear 58 extends upwardly from the arm 53 and is acted upon by a spring 59 in such a manner that the spring causes a partial rotation of the driving mechanism in a counterclockwise direction as viewed in Figs. 2 and 3, to the position shown in Figure 3, wherein the rollers 41 and 48 are out of engagement with the rear wheel 40 and the auxiliary wheel 22, respectively, when the rear wheel 22 is in its inactive position. The other end of the spring 59 bears against the vehicle frame. By virtue of the suitable pivotal mounting of the driving mechanism on the bolts 54 and 55, it will be seen that the mechanism is adapted to be engaged by the wheel 22 by its arcuate lowering operation and the pressure exerted on the roller 48 by the wheel 22 causes the driving mechanism to rotate in a clockwise direction, as viewed in Figs. 2 and 3, against the face of the spring 59 to a position in which the roller 41 bears against the tire 40, thereby a pressure sufficiently high to be satisfactory as a friction driving means is established between the two rollers and their respective wheels.

It will be noted that this construction is particularly adapted to conventional type automotive vehicles and does not require the addition of any extra actuating mechanism other than the use of the vertical movement of the auxiliary wheel into ground engagement. It is essentially a quiet drive and does not necessitate mechanism for meshing gears, splines, etc.

As is described in more detail in the above identified Patent No. 1,990,150, suitable means are provided which can be actuated from the driving compartment of the vehicle to cause the application of fluid pressure to the cylinder 31 which, in turn, causes the piston rod 32 to move outwardly and lower the auxiliary wheel 22 to the ground engaging position. The just mentioned means also moves the roller 41 into engagement with the main wheel 40. As is further described in the patent, the control means also serves to lock the main wheel 39 against rotation, so that with the auxiliary wheel 22 in the lowered position, the usual differential drive for the rear wheels may be used to rotate the main wheel 40. This rotation, in turn, causes the auxiliary wheel 22 to rotate and move the vehicle transversely. If the fluid pressure is relieved, it will be appreciated that the return spring 38 becomes effective to restore the parts to the retracted positions thereof shown in Fig. 3.

The specific control means, actuated from the driving compartment, forms no part of the present invention and so are not illustrated in the present drawing.

Attached to the vehicle chassis, I have shown the usual form of resilient type bumper 11. The tire cover 60 encloses a major portion of the rear elevation of the spare tire 22 view as well as a major portion of the diameter of said spare tire 22, when in the retracted position. The tire cover 60 may be supported on the vehicle chassis by the ears 61, and the wing nuts 62, and by the clip 63, which fastens over the back bar of the bumper 11. By this construction the tire cover is supported independently of said spare tire 22. The tire cover 60 is so formed with a slightly enlarged section 60a, as to allow the spare tire 22 to be lowered out of said tire cover while said tire cover 60 is rigidly attached to the vehicle chassis. Likewise, by means of the wing nuts 61, the tire cover may be manually removed by removing the wing nuts and lifting the cover substantially vertically to disengage the clips 63, to thereby allow removal of said spare tire from its support while in the inactive position for the purpose of tire change. It is obvious that the enlarged section 60a of the tire cover may be reduced, providing the spare tire 22 moves vertically to road engagement instead of through the transverse arc as illustrated herein.

By this construction it will be seen that applicant has provided a new and novel tire cover construction and support, which will allow the spare tire to be lowered into road contact, to be readily manually removable and can be formed of a solid structure without doors or like mechanism that would have to be opened automatically or manually to allow said spare tire to be lowered into ground contact. Practically all previous type tire covers have been supported on the spare tire and did not allow the spare tire to be lowered into ground contact and revolve without damage to the tire cover.

While I have described and illustrated several embodiments of my invention, it will be apparent to those skilled in the art that various changes, additions, omissions, and substitutions may be made therein without departing from the spirit and scope of my invention, as set forth in the accompanying claims.

I claim:

1. A vehicle, a spare tire, a vertically movable mounting for said spare tire, a cover for said spare tire comprising a housing conforming to the tire contour for a major portion of its periphery, said housing being supported on said vehicle independently of said spare tire, the lower portion of said tire being uncovered by said tire cover to allow said spare tire mounting to be lowered to lower said tire into road contact without moving said tire cover.

2. In combination with an automotive vehicle, regular vehicle supporting wheels, a spare wheel for said vehicle, mechanism connecting said wheel with the chassis of the vehicle and capable of operation for moving the same between an upper ineffective position and a lower position in which it is effective to lift the vehicle and move it transversely, a receptacle connected with said vehicle to partially enclose said spare wheel when the same is in its upper or ineffective position, the said receptacle having an opening in the lower portion thereof through which said wheel may move when it is lowered to its effective position, the axis of said auxiliary wheel being at substantially right angles to the axis of the regular vehicle wheels.

3. In combination with an automotive vehicle, a spare wheel for said vehicle, mechanism connecting said wheel with the chassis of the vehicle and capable of operation for moving the same between an upper ineffective position and a lower position in which it is effective to lift the vehicle and move it transversely, a receptacle connected with said vehicle to partially enclose said spare wheel when the same is in its upper or ineffective position, the said receptacle having an opening in the lower portion thereof through which said wheel may move when it is lowered to its effective position, the said spare wheel mounted transversely of the vehicle at the rear thereof.

4. In combination with an automotive vehicle, a spare wheel for said vehicle, mechanism connecting said wheel with the chassis of the vehicle and capable of operation of moving the same between an upper ineffective position and a lower effective position, and a receptacle rigidly connected with said vehicle to partially inclose said spare wheel when the same is in its upper or ineffective position, the said receptacle having an opening in the lower portion thereof through which said wheel may move when it is lowered to its effective position.

5. An automotive vehicle having a chassis, a spare wheel for said vehicle, a cover for said spare wheel, a vehicle lifting device, said vehicle lifting device connecting said spare wheel with the chassis of the vehicle and capable of operation for moving said spare wheel vertically between an upper ineffective position and a lower position in which the vehicle is partially lifted on said spare wheel, said cover connected with said vehicle to partially enclose said spare wheel when the same is in its upper inactive position, the said receptacle having an opening in the lower portion thereof through which said spare wheel may move when it is lowered to its lower position.

BROOKS WALKER.

Patent No. 2,139,341                                Granted December 6, 1938

BROOKS WALKER

The above entitled patent was extended July 24, 1951, under the provisions of the act of June 30, 1950, for 6 years and 214 days from the expiration of the original term thereof.

*Commissioner of Patents.*